Feb. 9, 1965  R. M. FAGAN  3,169,012
LANDING GEAR FOR CONVERTER DOLLIES
Filed March 1, 1962  3 Sheets-Sheet 1
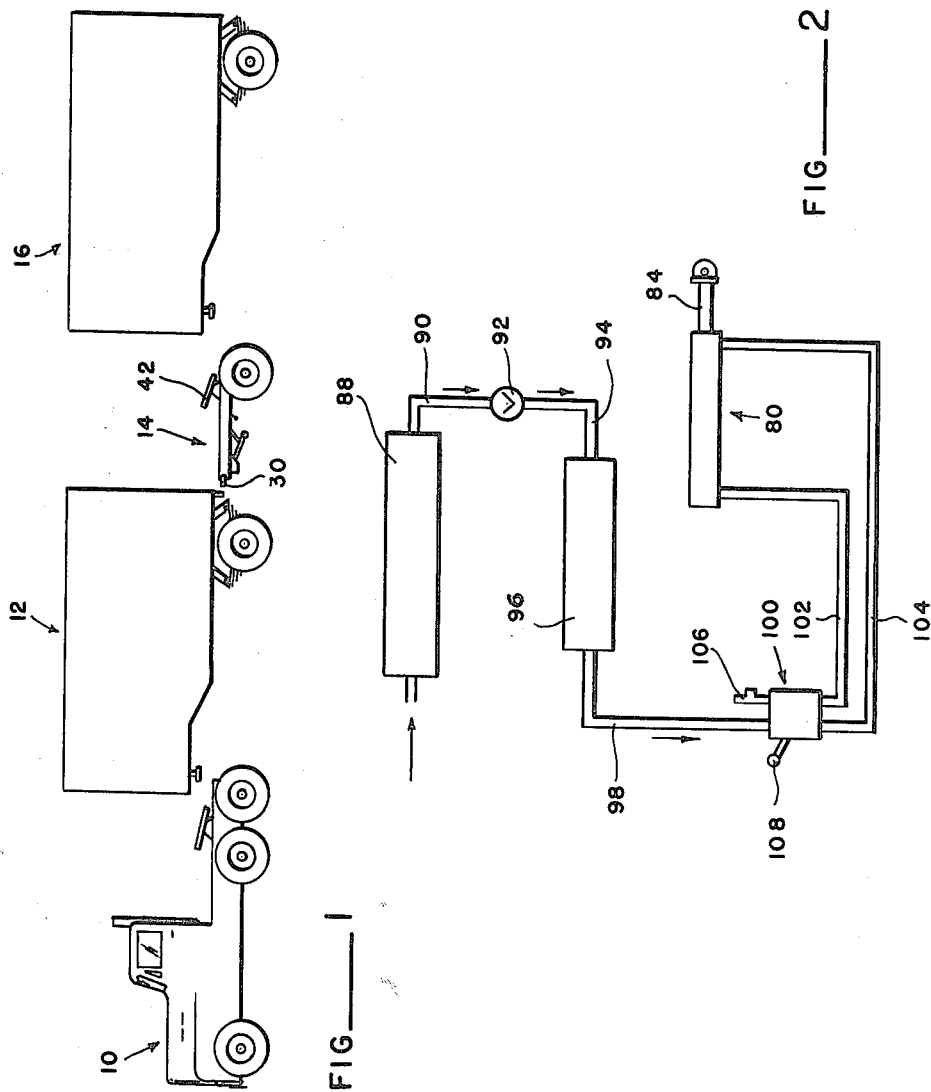
INVENTOR.
ROBERT M. FAGAN
BY
ATTORNEYS

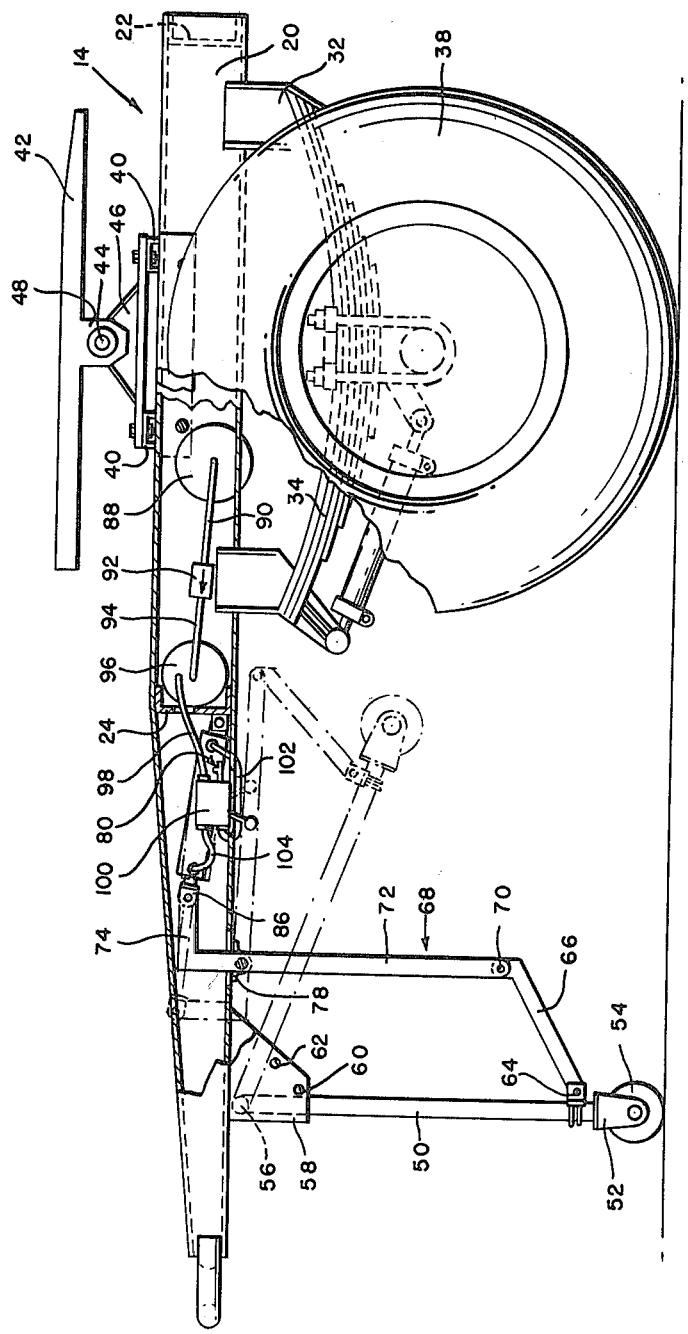
FIG—3

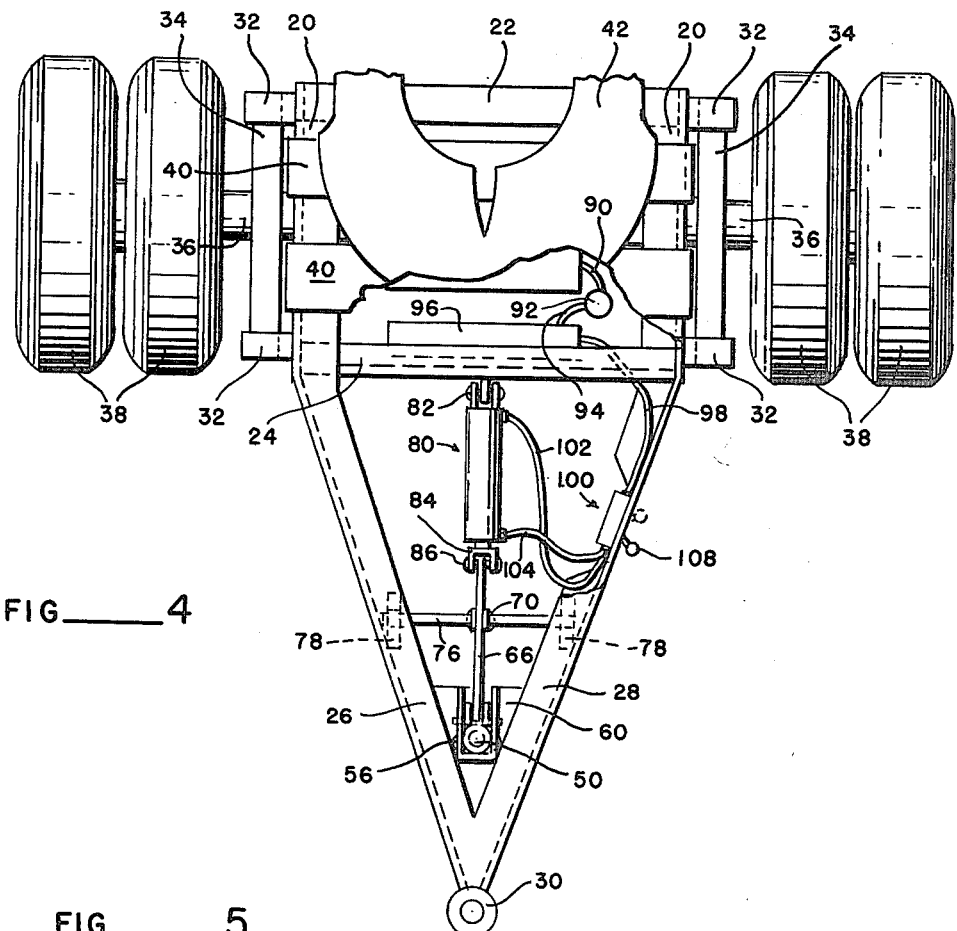
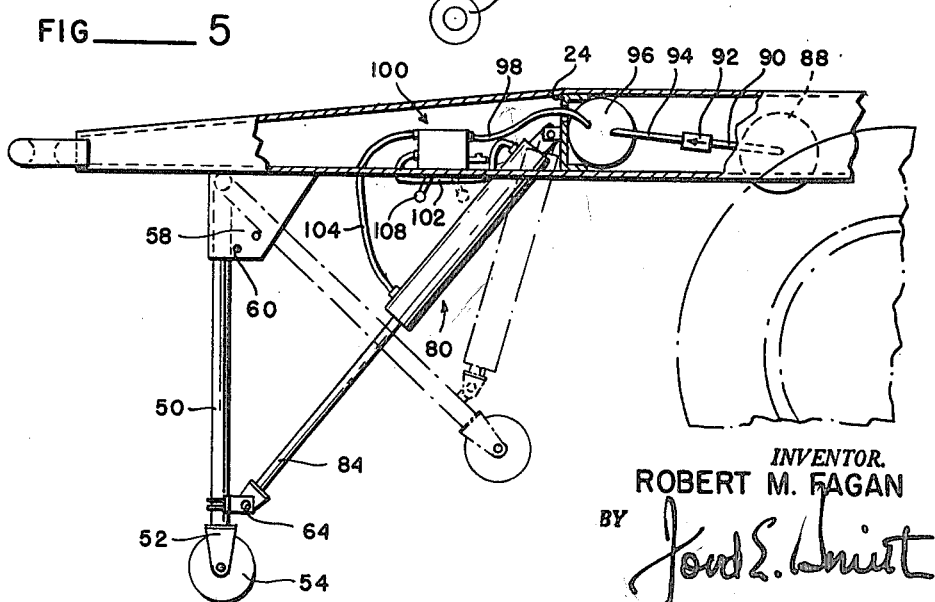

3,169,012
LANDING GEAR FOR CONVERTER DOLLIES
Robert M. Fagan, Seattle, Wash., assignor to F. L. & J. Manufacturing Co. Inc., Seattle, Wash., a corporation of Washington
Filed Mar. 1, 1962, Ser. No. 176,638
8 Claims. (Cl. 254—86)

This invention relates to a new and useful concept in a landing gear for converter dollies sometimes called "hitching dollies" and more particularly to a landing gear for converter dollies which utilizes a separate air system operating from the truck air supply to actuate said landing gear.

In many states it is legal to tow two box trailers with one truck tractor. The trailers or boxes as they are sometimes called are the cargo carrying part of the large trucking equipment which is commonly seen on the highways. These trailers are uniformly designed so that they are hitched at their front end to the towing device and are provided with wheels at the rear end thereof. When two trailers are towed the front of the first trailer is hitched to the fifth wheel at the back of the tractor. Hitching the second trailer to the back of the front trailer would involve overloading of the axles on the box trailers. It is therefore necessary to provide another axle under the front of the second trailer. To this end a converter or hitching dolly is hitched to the back of the first trailer. The converter is provided with two sets of dual wheels and an A-frame including means for hitching it to the first box trailer. The second box trailer is then connected to the fifth wheel of the converter. In this way an axle is provided for the front of the second box trailer.

Converters are used only for over the highway towing. When the truck has arrived at its destination it may be desirable to unhitch the tractor and park the box trailers wherever they may be needed as for loading or unloading or for simply storing them in the lot. Since all box trailers are provided at the front underside thereof with drop wheels which are used only when the trailer is parked, the converter itself can be disconnected and put immediately into use.

As those skilled in the art know each of the units of the complete truck including the tractor, two box trailers, and converter are connected to the tractor air supply. Each of these units has its own air tank which is an integral or essential component of the braking system on each of the units of the truck. When the truck is broken up and each of the units disconnected the air hoses must of necessity also be disconnected. Such disconnecting of the air hoses sets the brakes on each of the units for a designated period of time. Thus it is impossible for such period of time to move either of the box trailers or the converter. However, the tractor itself is able to move.

In disconnecting the number two box it is necessary to lower its drop wheels so that said box may be parked. Thus the box weight is taken off the converter. In order to move the converter away it is necessary that the air tank on the converter be bled of air so that the brakes will be released.

The converters are so designed so that the fifth wheel thereon is set on an A-frame over the axle with the tongue of the frame extending forwardly and having the appropriate hitching elements forwardly of the axle and fifth wheel. It will be seen then that the tongue will, unless supported in the front, simply drop to the ground. Conventional practice provides the forward end of the converter frame or tongue with a stiff leg usually referred to as a landing gear. The stiff leg or landing gear is retracted when the converter is in use and lowered when the converter has been disconnected from a truck and is parked. It is also conventional and normal practice to move the converters about the yard by hand. It has been found that stiff legs or landing gears for converters as heretofore known are unsafe because of their design. Some of the landing gears are actuated by manually operated screws. Others are actuated by no means at all but are raised and lowered by hand about a pivoted connection.

The absence on converters of a safe and reliable means for raising and lowering the landing gears has been a problem in the trucking industry for many years. Because of the manner in which the converters are now handled a great many personal injuries claims are being placed against the trucking companies.

Another problem results when the converters are to be connected to a truck. The converter is moved under the rear box trailer and connected. When the front box is moved into position to be attached to the converter it is sometimes found that the hitching ring of the converter is either too high or too low for the hitching mechanism on the back of the box trailer. Again the operator or other persons must retract the stiff leg and raise or lower the tongue of the converter by hand.

Another problem presently existing with regard to known types of landing gears is their inability to be retracted a sufficient distance from the ground to avoid being bent or broken or knocked off the converter completely by their striking some raised object on the ground or road surface. In short maintenance of the known types of converter landing gears is constantly recurring and therefore extremely costly.

This invention overcomes the difficulties attending present landing gears by providing an air operated actuating cylinder which may be connected through a linkage mechanism or attached directly to the stiff leg. An auxiliary air tank is attached to the converter tank and supplied with air from the main air tank. A one way check valve is interconnected in the air line between the two tanks so that the auxiliary can be filled with air from the main. Thus there is established a separate air supply for actuating the cylinder. At the same time the main tank may be bled of air so that the brakes on the converter are released, yet no air is bled from the auxiliary to interfere with operation of the landing gear system. It has been found that the landing gear may be retracted and extended approximately five times on the air in the auxiliary tank before the air supply has to be replenished. Since the converter landing gear need be used only once, or twice between unhitching and rehitching the fact that the converter is unhitched from the truck does not interfere with effective use of this landing gear.

The ability to employ air permits the operator to stand to one side of the converter and merely move the control lever in order to operate the landing gear. In this way labor time and costs are reduced to one quarter of old requirements.

These, together with other objects and advantages which will become subsequently apparent, reside in the details of construction and operation as more fully hereinafter described and claimed, reference being had to the accompanying drawings, forming a part hereof, wherein like numerals refer to like parts throughout, and in which:

FIGURE 1 is a diagrammatic representation of the equipment units required for a double trailer truck and the position which a converter trailer unit occupies with respect to the other units;

FIGURE 2 is a diagrammatic representation of the air system employed to actuate the landing gear cylinder;

FIGURE 3 is a side elevational view of a converter trailer with portions broken away showing the parts of the landing gear in their extended position;

FIGURE 4 is a top plan view of a converter trailer and the manner in which the landing gear and its control system are fitted to the converter frame;

FIGURE 5 is a partial elevational view of an alternative embodiment of this invention involving a direct connection between cylinder piston and landing gear leg.

Referring now to FIGURE 1 it can be seen that a complete double trailer truck is comprised of a tractor or power unit 10, a front or first box trailer 12, the converter 14, and the rear or second box trailer 16. Converter 14 (the details of which are best shown in FIGURES 3 and 4) is essentially a horizontally disposed A-frame constructed of heavy channel members. Such A-frame is provided at the back portion thereof with two generally parallel support members 20 which are rigidly interconnected by rear cross member 22 and forward cross member 24. Two tongue members 26 and 28 are joined to the forward ends of said support members 20 and angle inwardly to be secured together at the forwardmost ends thereof. Attached to the extreme front end of said tongue members is hitching ring 30. The A-frame has spring mountings 32 connected to support members 20 and conventional leaf springs 34. Axle 36 is supported by said springs 34 and the axle in turn supports a set of dual wheels 38 on each side of the A-frame. The top side of the A-frame has two transverse fifth wheel braces 40 which overlay and extend between and are rigidly connected to members 20. Said braces 40 are the main mounting structure for fifth wheel 42. Fifth wheel 42 pivots in a vertical plane about horizontal shaft 44 extending between upstanding brackets 46 and trunnions 48 on the fifth wheel. With the converter 14 thus generally described to provide the proper environment a detailed description of this invention will now be given.

The landing gear is comprised of a stiff leg 50 having a swivel yoke 52 at the bottom end thereof. Said leg 50 must be capable of withstanding extreme stress loads and therefore must be formed of strong material such as heavy steel tubing or the like. The leg 50 can assume any desired shape such as round or rectangular. Swivel yoke 52 is, of course, provided with a rotating caster 54.

The upper end of leg 50 is pivotally connected as at 56 near the underside of the forward portion of the A-frame tongue a short distance back from hitching ring 30. The pivot shaft 56 is placed in a guide mounting 58. Said mounting 58 is channel shaped and is positioned on the underside of the A-frame. The precise manner in which mounting 58 is attached to the converter A-frame is not essential to this invention except that it be secured as strongly as possible. The web or base portion of the mounting 58 faces forwardly in a generally vertical plane. The upper edges of said mounting may be directly connected to the frame, as by welding, or indirectly such as by the use of a plate 60 shown only for illustrative purposes.

The pivot point 56 is so located that the leg 50 swings about a point which is immediately under the A-frame and immediately adjacent the base of mounting 58. In this way when the leg 50 is down or extended, the upper portion of said leg will be resting against the inside surface of the base portion of said mounting 58. Since the bottom and rear sides of mounting 58 are open, leg 50 is free to swing rearwardly or into a retracted position. The sides of mounting 58 are tapered downwardly and forwardly from the upper edge thereof. Thus, it will be seen that the base acts as a forward stop for leg 50 and that the sidewalls of mounting 58 also act to guide and to provide some lateral or side support for leg 50. It is to be noted that the mounting 58 is provided with holes 60 and 62. With a safety pin, not shown, inserted in lower hole 60, leg 50 will be held in its down or extended position. By the same token when the leg is retracted and safety pin is inserted in hole 62 the leg 50 will be held in its retracted position.

At the lower end of leg 50 and just above the swivel yoke 52 is located a pivot connection 64 held on leg 50 in a conventional manner. It is to this pivot point 64 that the linkage mechanism for moving the stiff leg is attached. A follower link 66 is connected at one end thereof to pivot point 64. Follower link 66 extends upwardly and rearwardly and at the opposite end thereof connects to the lower end of rotating link 68. The connection between follower link 66 and rotating link 68 is a pivot connection as at 70. Rotating link 68 is approximately the same length as leg 50 while follower link 66 is perhaps half as long as said rotating link. The lower end of said rotating link 68 is placed above the lower end of leg 50 thus necessitating the upward and rearward angle of follower link 66.

Rotating link 68 is a generally L-shaped element in which the generally vertical arm extends upwardly to between the tongue members 26 and 28 of the A-frame tongue. The vertical or long part of rotating link 68 is designated by reference number 72. A shorter generally horizontal arm of rotating link 68 is designated by number 74. Rotating link 68 is pivotally secured to the underside of the A-frame in the following manner. A hole is provided in the upper end of vertical arm 72 several inches down from the topmost part of said rotating link 68. Through this hole is extended a pivot bar 76. Pivot bar 76 extends between the tongue members 26 and 28 and is attached to the underside of said tongue members 26 and 28 by bearing straps 78. Thus, there is provided a main pivot point or fulcrum about which the retracting linkage pivots.

As mentioned above the upper end of vertical arm 72 of rotating link 68 extends up into the area between A-frame tongue members 26 and 28. Generally horizontal arm 74 points rearwardly to connect to the piston rod. A pneumatic cylinder 80 completes the retracting mechanism assembly. A pivot connection 82 is provided between the front surface of cross member 24 on the A-frame and the rear of pneumatic cylinder 80. Cylinder 80 has piston rod 84 which in turn is pivotally connected as at 86 to the end of generally horizontal arm 74 on rotating link 68. Thus it can be seen that the entire portion of the retracting mechanism assembly is generally between the tongue members 26 and 28 and does not protrude above a plane drawn through the upper surfaces of the A-frame.

Cylinder 80 is a double acting type pneumatic cylinder. It must be capable, either directly or through the linkage mechanism just described to lift approximately five tons which may be bearing on the forward end of the converter A-frame. It will be understood then that the stresses and strains to which the stiff leg or landing gear is exposed are great. Obviously all pivot connections, the linkage elements and the cylinder, together with the stiff leg and its mounting 58 must be capable of absorbing concentrated impact loads. The dash-dot lines in FIGURE 3 show the approximate position of the various elements when the leg 50 is in its fully retracted position. In such fully retracted position vertical arm 72 of rotating link 68 can be seen to be nearly parallel to the A-frame itself while the generally horizontal arm 74 is pointing generally straight up. Even in this fully retracted position, however, it will be observed that the pivot connection between piston rod 84 and horizontal arm 74 is still within the confines of the area between tongue members 26 and 28.

The precise manner in which each of the linkage elements is connected to another element is not critical.

Suffice it to say that the general arrangement of cylinder linkage and landing gear connections is adhered to. An attempt to use the main air tank of the converter for the purposes of actuating cylinder 80 would be fruitless because the air in the tank must be bled to release the brakes before the converter can be moved. It was found to be necessary to install an auxiliary air tank in the converter in order to properly use the landing gear of this invention. An air line 90 leads from main air tank 88 through a one-way check valve 92 via a second air line 94 into the auxiliary air tank 96. The one way check valve 92 permits the auxiliary tank 96 to be filled with air from the main tank without the air leaving the auxiliary tank through the same lines. Therefore, once the auxiliary tank has been filled with air there is no way for the air to escape, except through its proper use in the actuating cylinder 80. Check valve 92 has as another feature its refusal to permit air to be directed from the main tank to the auxiliary tank until about sixty pounds of pressure has been attained in said main tank. Above sixty pounds the auxiliary tank then begins to build up pressure and continues to build up pressure until the pressure therein is that of the entire truck system, which is generally in the range of 100 to 125 pounds.

Air is taken from the auxiliary tank 96 through a line 98 into a selector valve generally designated by the number 100. By means of a control lever 108 air can be directed to either chamber of the double acting pneumatic cylinder 80. For instance line 102 directs air to the rear chamber which forces the piston rod 84 out. Another line 104 leads from the selector valve to the front chamber of the pneumatic cylinder, thus forcing the piston rod in. A restricter valve 106 is attached to the exhaust side of selector valve 100. Said restricter valve 106 has as its function to control the air flow from the cylinder. This air control for relief valve 106 determines the rate at which the piston 84 moves in and out of the cylinder.

As has been explained, this independent air system which works off the main air tank of the converter permits the converter to be disconnected, its main air tank bled, the converter moved and yet still have air by which to operate the landing gear. Enough pressure is stored in auxiliary tank 96 to permit four to six complete retractions and extensions of the landing gear. It is this ability of the invention to permit use of the landing gear when the converter is disconnected from a truck that gives this landing gear and its actuating system their value.

An alternative embodiment of this invention is seen in FIGURE 5. Instead of connecting the piston 84 through a linkage mechanism to stiff leg 50, the piston is connected directly to said stiff leg. In this way the cylinder acts directly on the stiff leg. The control system for the cylinder is the same as with the preferred embodiment. It should be mentioned that it is essential no matter how the cylinder and piston are finally connected to the stiff leg that the stiff leg connection be near the caster or the swivel yoke 52. Connecting either the linkage mechanism or the piston itself at a point low on the leg 50 adds rigidity to the entire landing gear structure. If the pivot connection on the stiff leg were raised that portion of the leg below the pivot connection would be susceptible to bending.

One advantage of the preferred embodiment of this invention is that the stiff leg and caster thereon may be raised as high as 22" from the roadway surface or from the ground. One of the disadvantages inherent in the heretofore known types of landing gears is the fact that many of them cannot be retracted high enough, thus they are continually being knocked off, broken or bent necessitating a considerable amount of maintenance and repair work. It is also necessary in designing a landing gear structure that none of the elements protrude above the A-frame. This invention satisfies that requirement.

A further observation should be made. The cylinder 80 can be mounted between the tongue members with its back end facing forwardly and the piston rod connection to linkage elements facing the back end of the converter. However, because of variations in the design and construction of converters it has been found that definite installation problems do arise in reversing the positions of the cylinder and piston rod. Thus, the most practical solution is to attach the cylinder to the frame as shown and described in the alternative embodiments herein.

It is believed that the above description suffices to convey adequately the operation of this device.

The foregoing is considered as illustrative only of the principle of this invention. Since numerous modifications and changes will readily occur to those skilled in the art, it is not desired to limit the invention to the exact construction and operation shown and described, and, accordingly, all suitable modifications and equivalents may be resorted to falling within the scope of the invention.

What is claimed is:

1. A landing gear mechanism for converter trailers, comprising:
    (a) an auxiliary air tank attached to the frame of said converter;
    (b) an air line leading from the main air tank on said converter to said auxiliary air tank, said air line having a check valve therein to permit flow of air from said main to said auxiliary tank and to prohibit air flow from said auxiliary to said main tank;
    (c) a stiff leg pivotally attached to the underside of said frame forwardly of said auxiliary tank for supporting the forward portion of said converter frame;
    (d) a pneumatic cylinder pivotally secured to said converter frame and having a piston rod pivotally connected to said stiff leg; and
    (e) a control means including a valve for actuating said piston rod and air lines for directing air from said auxiliary air tank through said valve to said cylinder.

2. A landing gear mechanism for converter trailers, comprising:
    (a) a stiff leg pivotally attached at its upper end to the underside of the front portion of the converter frame;
    (b) a first linkage element pivotally connected by one end thereof to the lower end of said stiff leg;
    (c) a second linkage element having a primary arm and a shorter secondary arm formed at right angles on the upper end of said primary arm, said second linkage element being rotatably mounted near the upper end of its primary arm to a stationary pivot on the underside of said converter frame, said secondary arm extending rearwardly, the lower end of said primary arm being pivotally connected to the other end of said first linkage element;
    (d) a pneumatic cylinder pivotally secured to said converter frame, said cylinder having a piston rod pivotally connected to said secondary arm of said second linkage element; and
    (e) an air supply and control system having an auxiliary air tank connected by a first air line to the main air tank of said converter, secondary air lines for supplying air to said cylinder from said auxiliary tank and control valve means installed in said secondary lines for actuating said piston rod.

3. A landing gear mechanism for converter dollies, comprising:
    (a) an auxiliary air tank attached to the frame of said converter;
    (b) an air line leading from the main air tank on said converter to said auxiliary air tank, said air line having a valve therein to permit flow of air from said main to said auxiliary tank and to prohibit air flow from said auxiliary to said main tank;
    (c) a stiff leg pivotally attached to the underside of said frame forwardly of said auxiliary air tank for supporting the forward portion of said converter frame;

(d) a pneumatic cylinder pivotally secured to said converter frame and having a piston rod adapted to be connected to said stiff leg; and (e) control means including a valve for actuating said piston rod and air lines for directing air from said auxiliary air tank through said valve to said cylinder.

4. A landing gear mechanism for converter dollies, comprising:

(a) an auxiliary air tank attached to the frame of said converter;

(b) an air line leading from the main air tank on said converter to said auxiliary air tank, said air line having a valve therein to permit flow of air from said main to said auxiliary air tank and to prohibit air flow from said auxiliary to said main tank;

(c) a stiff leg means pivotally attached to the underside of said frame forwardly of said auxiliary air tank for supporting the forward tongue portion of said converter frame;

(d) a pneumatic cylinder pivotally secured to said converter frame and having a piston rod therein for movement in and out of said cylinder;

(e) control means including a valve for actuating said piston rod and air lines for directing air from said auxiliary air tank through said valve to said cylinder; and (f) linkage element means pivotal on said converter frame and connecting said piston rod and said stiff leg means.

5. A landing gear mechanism for converter dollies, comprising:

(a) an auxiliary air tank attached to the frame of said converter;

(b) an air line leading from the main air tank on said converter to said auxiliary air tank, said air line having a valve therein to permit flow of air from said main to said auxiliary tank and to prohibit flow from said auxiliary to said main tank;

(c) a pneumatic cylinder pivotally secured by one end thereof to said converter frame and having a piston rod therein for movement in and out of the other end of said cylinder;

(d) control means attached to said converter frame including a valve for actuating said piston rod and also including air lines for directing air from said auxiliary air tank through said valve to said cylinder; and (e) stiff leg means pivotally secured to the underside of said converter frame for supporting the tongue portion of said converter frame, said stiff leg means being adapted to be pivotally attached to said piston rod.

6. A landing gear mechanism for converter dollies, comprising:

(a) an auxiliary air tank attached to the frame of said converter;

(b) an air line leading from the main air tank on said converter to said auxiliary air tank, said air line having a valve therein to permit flow of air from said main to said auxiliary tank and to prohibit flow from said auxiliary to said main tank;

(c) a pneumatic cylinder pivotally secured at one end thereof to said converter frame and having a piston rod therein for movement in and out of the other end of said cylinder;

(d) control means attached to said converter frame including a valve for actuating said piston rod and also including air lines for directing air from said auxiliary air tank through said valve to said cylinder;

(e) stiff leg means pivotally secured to the underside of said converter frame on the tongue portion of said frame; and (f) linkage means pivotally connected to said stiff leg and to said piston rod for extending and retracting said stiff leg about its pivot point.

7. A landing gear mechanism for attachment to a converter dolly having an A-frame, comprising:

(a) a first air tank attached to the frame of said converter;

(b) an air line leading from a second air tank on said converter to said first air tank, said air line having a one-way valve therein to permit flow of air from said second to said first air tank and to prohibit flow from said first to said second air tank;

(c) a pneumatic cylinder pivotally secured by its rear end to said A-frame in a position generally rearwardly of the point of said A-frame and in such a way that the piston rod thereof faces generally toward the point of said A-frame;

(d) control means attached to said converter frame including a valve for actuating said piston rod and including air lines for directing air from said first air tank through said valve to said cylinder;

(e) stiff leg means pivotally secured to the underside of the point of said A-frame, said stiff leg means being capable of swinging from a generally vertical position when extended to a substantially horizontal position when retracted;

(f) a generally L-shaped first linkage means having a short leg and a long leg, said first linkage means being pivotally mounted on said A-frame between said stiff leg pivot and said piston rod so that the free end of said short leg extends generally horizontally rearwardly and is rotatably attached to the end of said piston rod;

(g) a second linkage means pivotally attached by one end to the lower end of said stiff leg means and pivotally attached by its other end to the free end of said long leg of said first linkage means.

8. A landing gear mechanism for attachment to a converter dolly having a forwardly pointing A-frame, comprising:

(a) a first air tank attached to the frame of said converter;

(b) an air line leading from a second air tank on said converter to said first air tank, said air line having a one-way valve therein to permit flow of air from said second to said first air tank and to prohibit flow from said first to said second air tank;

(c) a pneumatic cylinder pivotally secured by its rear end to said A-frame in a position generally rearwardly of the point of said A-frame and in such a way that the piston rod thereof faces generally toward the point of said A-frame;

(d) control means attached to said converter frame including a valve for actuating said piston rod and including air lines for directing air from said first air tank through said valve to said cylinder;

(e) stiff leg means pivotally secured to the underside of the point of said A-frame and including a U-shaped guide and strengthening bracket opening rearwardly with the closed side of said bracket extending generally vertically and facing forwardly, said stiff leg means being capable of swinging from a generally vertical position when extended to a substantially horizontal position when retracted;

(f) a generally L-shaped first linkage means having a short leg and a long leg, said first linkage means being pivotally mounted on said A-frame between said stiff leg pivot and said piston rod so that when said stiff leg is extended the free end of said short leg extends generally horizontally rearwardly and is rotatably attached to the end of said piston rod and said long leg extends generally downwardly;

(g) a second linkage means pivotally attached by one end to the lower end of said stiff leg means and pivotally attached by its other end to the free end of said long leg of said first linkage means.

References Cited in the file of this patent

UNITED STATES PATENTS

| | | |
|---|---|---|
| 2,056,525 | Johnson | Oct. 6, 1936 |
| 2,232,754 | Winn | Feb. 25, 1941 |
| 2,733,931 | Reid et al. | Feb. 7, 1956 |
| 2,751,231 | Meidinger | June 19, 1956 |

FOREIGN PATENTS

| | | |
|---|---|---|
| 497,338 | Great Britain | Dec. 15, 1938 |
| 780,461 | Great Britain | July 31, 1957 |